US012465042B2

(12) United States Patent
Groffils et al.

(10) Patent No.: US 12,465,042 B2
(45) Date of Patent: Nov. 11, 2025

(54) DEVICE FOR TREATING WEEDS BY MEANS OF MICROWAVES

(71) Applicants: TIENSE SUIKERRAFFINADERIJ NV, Tienen (BE); MEAM BV, Herent (BE)

(72) Inventors: Carlo Groffils, Herent (BE); Karel Groffils, Herent (BE); Minh Cuong Tran, Heverlee (BE)

(73) Assignees: TIENSE SUIKERRAFFINADERIJ NV (BE); MEAM BV (BE)

( * ) Notice: Subject to any disclaimer, the term of this patent is extended or adjusted under 35 U.S.C. 154(b) by 274 days.

(21) Appl. No.: 18/275,348

(22) PCT Filed: Jan. 26, 2022

(86) PCT No.: PCT/EP2022/051720
§ 371 (c)(1),
(2) Date: Aug. 1, 2023

(87) PCT Pub. No.: WO2022/161987
PCT Pub. Date: Aug. 4, 2022

(65) Prior Publication Data
US 2024/0114888 A1   Apr. 11, 2024

(30) Foreign Application Priority Data
Feb. 1, 2021   (BE) .................................. 2021/5071

(51) Int. Cl.
*A01M 21/04*   (2006.01)

(52) U.S. Cl.
CPC .................. *A01M 21/046* (2013.01)

(58) Field of Classification Search
CPC ...................................... A01M 21/046
USPC ................................. 324/637–638
See application file for complete search history.

(56) References Cited

U.S. PATENT DOCUMENTS

| 5,060,414 A | 10/1991 | Wayland | 47/1.3 |
| 6,401,637 B1 * | 6/2002 | Haller | A01M 1/226 111/118 |
| 2023/0270036 A1 * | 8/2023 | Groffils | G06V 20/188 47/1.3 |

FOREIGN PATENT DOCUMENTS

| CA | 3089518 | 8/2019 | ............ A01B 39/06 |
| FR | 2770969 | 5/1999 | ............ A01M 21/04 |
| FR | 3077957 | 8/2019 | ............ A01M 21/00 |
| WO | 2017141180 | 8/2017 | ............ A01M 17/00 |
| WO | 2018112531 | 6/2018 | ............ A01M 21/04 |
| WO | WO-2022023913 A1 * | 2/2022 | ............ H05B 6/80 |

OTHER PUBLICATIONS

International Search Report and Written Opinion issued in PCT/EP2022/051720, dated May 13, 2022, 10 pages.
International Preliminary Report on Patentability issued in PCT/EP2022/051720, dated Jul. 31, 2023, 7 pages.

* cited by examiner

Primary Examiner — Christopher E Mahoney
(74) Attorney, Agent, or Firm — HAYES SOLOWAY P.C.

(57) ABSTRACT

Disclosed are methods and apparatus for treating weeds, and more specifically treating weeds by use of microwaves.

23 Claims, 5 Drawing Sheets

DEVICE FOR TREATING WEEDS BY MEANS OF MICROWAVES

TECHNICAL FIELD

The present disclosure relates to methods and means for treating weeds, and more specifically treating weeds by means of microwaves.

TECHNOLOGICAL BACKGROUND OF THE INVENTION

Weed control on a small scale, for example by individuals or municipal services, is still mostly carried out nowadays by means of herbicides which are sprayed onto the weeds in fluid or aerosol form. Known, for example, are pressurized tanks that are carried on the back and where the user uses a sprayer that is connected to the tank. Because of the harmful consequences of these means for the environment, there is a move towards alternative, eco-friendly solutions.

These solutions comprise, inter alia, the mechanical removal of weeds, or treating them by means of treatment with electric current or using gas burners. However, mechanical removal requires an overly high treatment frequency, as is also the case for treatment with electric current, which is furthermore energy inefficient. The use of gas burners is an expensive solution and is also not ecologically responsible due to the accompanying $CO_2$ emissions. Moreover, the burning of weeds by means of electric current or gas burners presents a risk of fire when used on dry soil.

The use of microwaves to control weeds is another eco-friendly solution, but it is mostly used in larger machines that are unsuitable for manual use. Patent publication CA3089518, for example, describes a device that consists of a portable holder connected via a cable to a voltage source such as a power network or a battery. The holder is in the shape of an elongate shank with a handle at one end and a microwave generator/waveguide combination at the other end. The generator is a magnetron, i.e., an electron tube in which a high-frequency electromagnetic field is generated. However, the weight of this assembly is substantial, making the holder heavy and difficult to handle.

This device also presents a potential risk to the user due to the high voltage being supplied to the generator. A housing for a battery is not explicitly described other than in the suggestion to attach the battery to the shank-shaped holder in addition, making the assembly even more unwieldy. There is thus a need to develop a compact and user-friendly way of treating weeds with microwaves.

SUMMARY

The present disclosure provides a solution to the needs of the prior art as described above. The device includes a portable portion that includes a microwave generator as well as a battery for powering the generator. The device further includes a transmission line for conveying a signal generated by the generator, a holder that can be held by the user by one end thereof and an antenna system that is attached to the other end, and to which the transmission line is connected. In the antenna system, the signal is converted into microwaves which are guided to the outside in the vicinity of a zone to be treated. The generator is preferably a solid-state generator. The antenna system is intended to quickly heat the zone in question to a desired temperature. The device includes a control unit that is configured to adjust the parameters of the generator and potentially of the antenna system on the basis of input provided by the user and/or by sensors which detect information on the zone to be treated or on other parameters, such as, for example, the temperature of the generator.

By virtue of the fact that the generator is located in a portable portion and is not attached to the holder itself, the device as described in the present disclosure is easier to handle than existing devices and is also less tiring for the carrier thereof.

The use of a solid-state generator further has the advantage that it consumes less than a magnetron and is easier to regulate, so that the microwave energy generated for weed control can be utilized with high efficiency, and is also safer for the user.

The device also provides a feedback unit that can ensure the safety of the user while treating weeds by distinguishing between plant tissue in a zone to be treated and an obstruction, such as a human's or animal's body. For additional safety, the feedback unit can be configured to reduce the power of the microwave generator or to switch off the generator, or to block the emission of the microwaves, for example using a slidable safety cover.

Another aspect of the present disclosure relates to a device for treating weeds by means of microwaves, wherein the device comprises the following components:
- a portion to be carried by the user that includes a housing within which a microwave generator and a battery configured to supply the generator with power are arranged,
- a holder provided with at least two ends, wherein the holder can be held by the user by one end and wherein an antenna system is attached to the other end, suitable for guiding microwaves out into a zone to be treated,
- a transmission line for transmitting a microwave signal generated by the generator from the generator to the antenna system.

Another aspect of the present disclosure relates to a device for treating weeds by means of microwaves, characterized in that the device comprises the following components:
- portable portion configured to be secured to the body of a user; wherein the portable portion comprises a housing within which a microwave generator is arranged, and a power supply for supplying power to said generator;
- a holder provided with at least two ends, wherein the holder can be held by the user by one end and wherein an antenna system is attached to the other end, which is configured for guiding microwaves out into a zone to be treated;
- a transmission line configured for transmitting the microwaves from the microwave generator to the antenna system.

In an embodiment the power supply may comprise a power source, preferably a rechargeable and/or exchangeable battery.

In an embodiment the power supply may comprise a plug for connecting a power cable connected to an external power source, and optionally a device for the transmission of electrical energy by means of which the energy of the power source is adjusted to the power requirements of the microwave generator, preferably a transformer.

In an embodiment the microwave generator is a solid-state microwave generator; preferably characterized by a consumption of 250 W and/or a voltage of 30 V.

In an embodiment the antenna system includes three components arranged one after the next:

a signal adapter for converting the signal from the transmission line into microwaves,
a waveguide, and
an antenna or group of antenna elements.

In an embodiment the waveguide is an impedance adapter, the impedance of which can be adjusted manually or automatically, so that few to no reflections occur at the transition between the antenna or group of antenna elements and the zone to be treated.

In an embodiment the waveguide is a guide with a predetermined impedance such that few to no reflections occur at the transition between the antenna or group of antenna elements and the zone to be treated when the impedance of this zone is in a predetermined range around the value of 377 ohm, i.e. the impedance of free space.

In an embodiment the antenna has an inlet section that is coupled to the waveguide, and a slot-shaped outlet section along which the microwaves are guided to the outside.

In an embodiment the housing of the portable portion includes a cooling element configured for cooling the generator and/or the power supply, preferably battery.

In an embodiment the portable holder has two ends, wherein the first end of which is provided with a handle for the user and the other end of which is coupled to the antenna system.

In an embodiment the portable holder is an elongate shank-shaped holder, the first end of which is provided with a handle for the user and the other end of which is coupled to the antenna system.

In an embodiment the handle is provided with an input device for the user and/or with indicators provided to give the user information on a treatment of a determined zone.

In an embodiment the shank-shaped holder is provided with a hollow passage, wherein part of the transmission line is located in the hollow passage of the holder.

In an embodiment the antenna system and/or the end of the holder is provided with a roller system by means of which the user can roll the holder over the ground during the treatment of a zone.

In an embodiment the device comprises a control unit, which is operatively connected to or forms part of the microwave generator and is configured to control the operation of the microwave generator on the basis of the user's input, detected information regarding a zone to be treated, and/or detected information regarding the operation of the device itself.

In an embodiment the device comprises a temperature sensor, which is connected to the control unit, and wherein the control unit is configured to adjust the operation of the microwave generator on the basis of the measured temperature, preferably by switching off the microwave generator when a predetermined threshold value is exceeded.

In an embodiment the device comprises a feedback unit configured to detect a change in the impedance of a treated zone outside of a predetermined range around a desired value of this impedance, and to intervene in the operation of the generator when said change is detected.

In an embodiment the feedback unit is configured to function as a safety measure by preventing the emission of microwaves from the device whenever the presence of non-weed organic material and/or inorganic material is detected in the zone to be treated; preferably by reducing the power of the microwave generator to a harmless level, switching off the generator, and/or mechanically blocking the emission of the microwaves from the antenna system.

In an embodiment the device comprises a feedback unit configured to detect a change in the impedance of a treated zone by measuring and/or determining a wave reflection, a standing wave ratio and/or a reflection coefficient, and to intervene in the operation of the generator, preferably to prevent the emission of microwaves, when
the wave reflection is lower than or equal to 30%,
the standing wave ratio is lower than or equal to 8, and/or
the reflection coefficient is higher than or equal to 0.8.

In an embodiment the feedback unit is configured to function as an efficiency measure by dynamically adjusting one or more operating parameters of the microwave generator whenever a reduction of the Q-factor is determined; preferably by adjusting the microwave frequency to correspond with the resonance frequency of the treated zone.

In an embodiment the device comprises a feedback unit configured to detect a change in the impedance of a treated zone by measuring and/or determining a wave reflection, a standing wave ratio and/or a reflection coefficient, and to intervene in the operation of the generator, preferably to dynamically adjust one or more operating parameters of the device, when
the wave reflection is higher than or equal to 30%,
the standing wave ratio is higher than or equal to 8, and/or
the reflection coefficient is lower than or equal to 0.8.

Another aspect of the present disclosure relates to a method for treating weeds by means of microwaves, the method comprising:
(a) generating microwaves using a microwave generator;
(b) directing generated microwaves towards a zone to be treated;
(c) determining an impedance value of the zone to be treated by determining a wave reflection, a standing wave ratio and/or a reflection coefficient;
(d) continuing with the directing of generated microwaves when
a wave reflection is lower than or equal to 30%,
a standing wave ratio is lower than or equal to 8, and/or
a reflection coefficient is higher than or equal to 0,8;
and/or stopping the directing of generated microwaves when
a wave reflection is higher than 30%,
a standing wave ratio is higher than 8, and/or
a reflection coefficient is lower than 0.8.
(e) optionally, dynamically adjusting one or more operating parameters of the microwave generator whenever a reduction of the Q-factor is determined, preferably by adjusting the microwave frequency to correspond with the resonance frequency of the treated zone.

Another aspect of the present disclosure relates to the use of a device as described herein for treating weeds.

Another aspect of the present disclosure relates to a use of a feedback unit as described herein in a device for treating weeds by means of microwaves.

Another aspect of the present disclosure relates to a device for treating weeds by means of microwaves, wherein the device comprises the following components:
a microwave generator and a power supply for supplying power to said generator are arranged;
an antenna system which is configured for guiding microwaves out into a zone to be treated,
optionally, a transmission line or waveguide configured for transmitting the microwaves from the microwave generator to the antenna system; and
a control unit that is operatively connected to or forms part of the microwave generator; wherein said control unit is configured detect a change in the impedance of a treated zone outside of a predetermined range around a desired value of this impedance, and to intervene in the operation of the device when said change is detected.

In an embodiment the device comprises or is arranged on a vehicle, preferably an autonomous vehicle (AV), or comprises a drive means for moving said device over the zone to be treated.

DESCRIPTION OF THE FIGURES

The following description of the figures of specific embodiments of the disclosure are merely exemplary in nature and is not intended to limit the present teachings, their application or uses.

Throughout the description, claims and figures, the following numbering is retained: portable portion 1; transmission line 2; antenna system 3; holder 4; housing 10; securing device 11; power source 12; assembly 13; microwave generator 14; heat exchanger 15; fans 16; connection 17; signal adapter 20; first coupling flange 22; waveguide 23; antenna 24; second coupling flange 25; lateral control means 26; outlet 27; roller system 28; wheels 29; zone to be treated 30.

DETAILED DESCRIPTION

Figure 1:
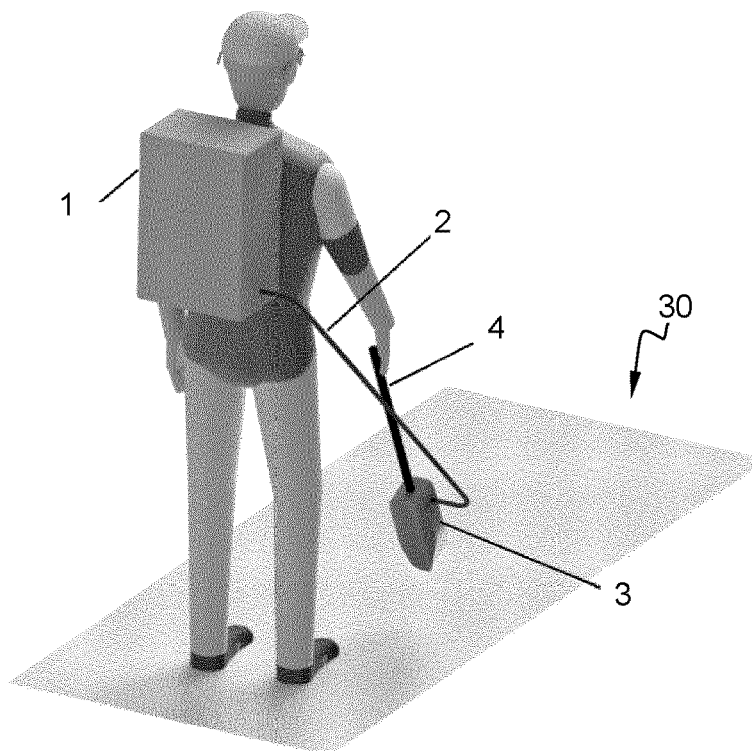
FIG. 1 shows a device according to a preferred embodiment thereof.

The present disclosure will be described with respect to particular embodiments, but the disclosure is not limited thereto but only by the claims. Any reference signs in the claims shall not be construed as limiting the scope thereof.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" when referring to recited members, elements or method steps also include embodiments which "consist of" said recited members, elements or method steps.

The recitation of numerical ranges by endpoints includes all numbers and fractions subsumed within the respective ranges, as well as the recited endpoints.

Furthermore, the terms first, second, third and the like in the description and in the claims, are used for distinguishing between similar elements and not necessarily for describing a sequential or chronological order, unless specified. It is to be understood that the terms so used are interchangeable under appropriate circumstances and that the embodiments of the disclosure described herein are capable of operation in other sequences than described or illustrated herein. Unless otherwise defined, all terms used in disclosing the invention, including technical and scientific terms, have the meaning as commonly understood by one of ordinary skill in the art to which this disclosure belongs. By means of further guidance, definitions for the terms used in the description are included to better appreciate the teaching of the present invention. The terms or definitions used herein are provided solely to aid in the understanding of the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the features, structures or characteristics may be combined in any suitable manner, as would be apparent to a person skilled in the art from this disclosure, in one or more embodiments. Furthermore, while some embodiments described herein include some, but not other features included in other embodiments, combinations of features of different embodiments are meant to be within the scope of the invention, and form different embodiments, as would be understood by those in the art. For example, in the following claims and description, any of the claimed or described embodiments can be used in any combination.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. The term "coupled," as used herein, is defined as directly or indirectly connected in an electrical or nonelectrical (i.e. physical) manner Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. Unless otherwise stated, use of the term "about" in accordance with a specific number or numerical range should also be understood to provide support for such numerical terms or range without the term "about". For example, for the sake of convenience and brevity, a numerical range of "about 50 angstroms to about 80 angstroms" should also be understood to provide support for the range of "50 angstroms to 80 angstroms." Furthermore, it is to be understood that in this specification support for actual numerical values is provided even when the term "about" is used therewith. For example, the recitation of "about" 30 should be construed as not only providing support for values a little above and a little below 30, but also for the actual numerical value of 30 as well.

Reference in this specification may be made to devices, structures, systems, or methods that provide "improved" performance. It is to be understood that unless otherwise stated, such "improvement" is a measure of a benefit obtained based on a comparison to devices, structures, systems or methods in the prior art. Furthermore, it is to be understood that the degree of improved performance may vary between disclosed embodiments and that no equality or consistency in the amount, degree, or realization of improved performance is to be assumed as universally applicable.

In addition, embodiments of the present disclosure may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the present disclosure may be implemented in software (e.g., instructions stored on non-transitory computer-readable medium) executable by one or more processing units, such as a microprocessor and/or application specific integrated circuits ("ASICs"). As such, it should be noted that a plurality of hardware and software-based devices, as well as a plurality of different structural components may be utilized to implement the invention. For example, "servers" and "computing devices" described in the specification can include one or more processing units, one or more computer-readable medium modules, one or more input/output interfaces, and various connections (e.g., a system bus) connecting the components.

From previous research, it is known that raising the internal temperature of at least part of a plant's body to about 50° C. can result in the definitive death of generic weeds. The optimum temperature can depend on the targeted plant type and the stage of plant growth. The present invention is found to be particularly suitable for controlling the growth of immature weeds, i.e. weed plants that are still at an early stage of growth and have a thin stem. At an immature stage, the weed has already developed into a seedling with a thin stem. Nevertheless, it is clear that the present invention can also be used to combat weeds at the seed stage, i.e. seeds that are present in the ground, or at a fully grown stage, i.e. with a thicker stem.

What is meant by "weed" in the present description is a plant that is considered to be undesirable in a given situation or environment, and typically comprises non-crop plants in an agricultural field. Examples of weeds are, inter alia, thistle, yarrow, common purslane, red clover, redshank, chamomile, stinging nettle, grass, Bermuda grass, bindweed, broadleaf plantain, burdock, white goosefoot, dandelion, goldenrod, knotweed and the knotweed family, spurge, milk thistle, dock and sorrel, St John's wort, wild carrot, white clover, wood sorrel, black nightshade, and the like.

By controlling the growth of weeds with the aid of the invention of the present disclosure, the growth of desired plants such as crops can be improved, which can increase the yield of agricultural fields. Examples of crops are, inter alia, sugar beet, fodder beet, beetroot, sugarcane, barley, maize, millet, rye, wheat, cassava, potatoes, chicory, peas, beans, cabbage, carrots, flax, rapeseed, sunflowers, or crops such as brassicas, fruit trees, berry bushes and the like.

To produce the heating described above, the invention of the present disclosure makes use of microwaves. Microwaves are found in the electromagnetic spectrum within a frequency range between 300 MHz and 300 GHz. The absorbed microwave energy is directly dependent on the frequency of the microwaves, i.e. higher microwave frequency means a shorter wavelength and thus more microwave energy. As such, generating microwaves at a higher frequency can result in quicker heating of a target, such as a weed, at the cost of a smaller target size or smaller volume. Increasing the frequency of microwaves also decreases the depth to which the microwaves can penetrate into a target, such as the plant cells. Quick heating can give rise to a pressure effect that will burst the cells of the plant, resulting in death from the inside out. As such, the weed is not burned and hence presents no fire hazard, which means that the device can be safely applied on both wet and dry soils alike.

A first overview of various components of the invention of the present disclosure is given hereinbelow, after which specific embodiments will be described in more detail. This first overview is meant to aid the reader in understanding the technological concepts more quickly, but it is not meant to identify the most important or essential features thereof, nor is it meant to limit the scope of the present invention.

FIG. 1 shows one possible embodiment of a device according to the invention. The device comprises a portable portion 1 on the user's back that is connected to an antenna system 3 via a transmission line 2. The antenna system 3 is attached to the end of a holder 4, the opposite end of which is held by the user. In the embodiment shown the holder 4 is in the shape of an elongate shank; it is a shank-shaped holder.

Figure 2:
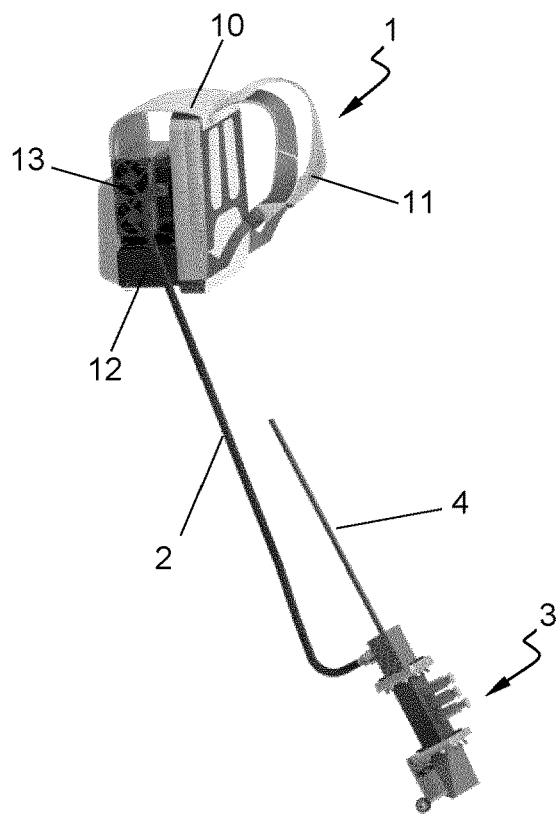
FIG. 2 shows the device of FIG. 1, wherein the components of the portable portion 1 are made visible.

As can be seen in FIG. 2, the portable portion 1 comprises a housing 10 provided with shoulder straps 11, so that the assembly can be carried simply like a backpack/rucksack. The length of the shoulder straps can be adjustable so as to fasten the portable portion 1 securely to the carrier's upper body. It is evident that the housing 10 can be provided with another or additional securing means 11 that allows the portable portion to be secured to a portion of the body other than the user's back or shoulders. By way of example, the housing can comprise a belly plate that allows the portable portion to be supported on the carrier's belly, or a belt that secures the portable portion to the user's hips, etc. The secure fastening of the portable portion can be achieved by providing a securing means as known in the prior art, such as a Velcro, buttons, snap-in or hooking connecting mechanisms, etc. A person skilled in the art thus understands that the configuration of the portable portion can be adapted according to the desired comfort of the carrier and/or weight of portable portion.

Figure 3:
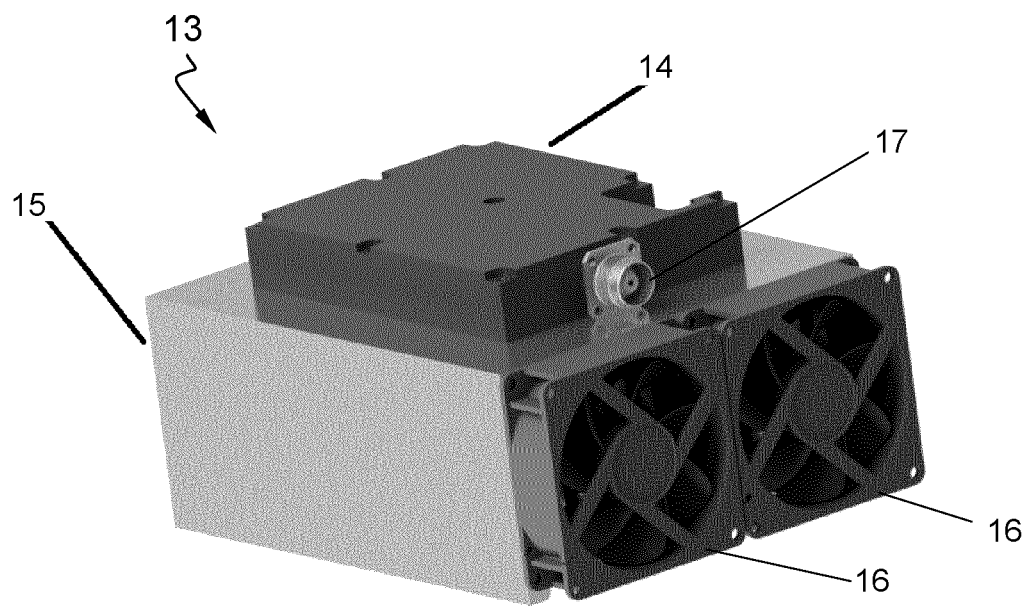
FIG. 3 shows the assembly 13 of the solid-state microwave generator 14 and cooling elements, as part of the device of FIG. 1.

The housing 10 comprises a power source 12, preferably in the form of a portable battery, which is advantageously rechargeable and/or exchangeable, and an assembly 13 of elements which is shown in more detail in FIG. 3. The assembly 13 comprises a solid-state microwave generator 14 which is secured to a heat exchanger 15. Two fans 16, also powered by the battery, are mounted on the side edge of the heat exchanger, which are intended to blow air through the heat exchanger in order to cool the microwave generator 14 and the battery 12. The housing 10 must allow the airflows in and out of the exchanger 15 and is thus, at least at the places necessary therefor, air-permeable. The heat exchanger 15 can be produced according to any existing design that is intended to carry away the heat from a heat source mounted on the exchanger and/or positioned in contact therewith. The microwave generator 14 and the fans 16 can be connected to the battery 12 via electrical conductors (not shown in the figures).

It is evident that the assembly can be provided with another or additional cooling elements configured for cooling of the microwave generator and/or the power source, preferably battery. The combination of the heat exchanger 15 and fans 16 is a preferred embodiment of the cooling element. Other embodiments of a cooling element suitable for cooling the generator 14 and the battery 12 are possible within the scope of the invention. According to one alternative embodiment, the cooling element comprises a liquid cooling system comprising an arrangement of liquid lines and at least one pump for pumping liquid coolant through the liquid cooling system. The liquid cooling system can comprise further features that are generally used in the art for such systems, including, but not limited to, fittings, adapters, lines, valves, etc.

Preferably, the housing 10 also includes an electronic control unit (not shown in the figures), which is supplied with power by the battery 12 and which is intended to control the operation of the generator 14 and of the fans 16 according to a control algorithm which is not defined per se within the scope of this invention, but which at least allows the generator to be switched on and off, and advantageously also allows the power or other parameters of the generator to be controlled. Operating means are provided therefor, whether inside the housing or on the outside thereof, or on the holder, for example in the form of operating buttons at the level of a handle. In this latter case, there is preferably wireless communication between the holder 4 and the control unit. The control unit can also form an integral part of the generator 14, as is the case with certain existing types of microwave generators that are usable in a device according to the invention (see below).

The connection 17 is also visible on the solid-state microwave generator 14 in FIG. 3, to which the transmission line 2 is connected. Both solid-state microwave generators and transmission lines and connections suitable therefor are known per se. The transmission line 2 is preferably a coaxial line that is intended to convey a high-frequency electrical signal from the generator 14 to the antenna system 3.

The solid-state microwave generator can be a generator that is commercially available on the market. Preferably, use is made of a type of generator with an integrated control unit that makes it possible to detect changes in the impedance of the load consisting of the transmission line, the antenna system and the treated zone, and to adapt the delivered power thereto. This will be discussed in more detail further on in this description.

In some embodiments, the solid-state microwave generator operates with a power between 25 W and 400 W, preferably between 50 W and 375 W, or between 75 W and 350 W, or between 100 W and 325 W, or between 125 W and 300 W, or between 150 W and 275 W, or between 175 W and 250 W, or between 175 W and 225 W, for example 200 W. Combinations of power amplifiers can be used to reach the desired operating power; for example, to supply a 200 W semiconductor generator with power, two 100 W amplifiers can be used, or four 50 W amplifiers, etc.

The voltage required to power the solid-state generator can be around 30 V. The microwave generator can be configured to generate microwaves that are typically within a frequency range of 1.0 GHz to 20.0 GHz. For usability, i.e. efficient and safe killing of weeds, the microwaves will preferably be within a frequency range from at least 2.0 GHz to at most 6.0 GHz, preferably at least 3.0 GHz, more preferably at least 4.0 GHz, more preferably still at least 5.0 GHz, more preferably still about 5.8 GHz.

The generated microwaves can have a frequency of at least 2.0 GHz, for example 2.1 GHz, 2.2 GHz, 2.3 GHz, 2.4 GHz, 2.5 GHz, 2.6 GHz, 2.7 GHz, 2.8 GHz or 2.9 GHz; preferably at least 3.0 GHz, for example 3.1 GHz, 3.2 GHz, 3.3 GHz, 3.4 GHz, 3.5 GHz, 3.6 GHz, 3.7 GHz, 3.8 GHz or 3.9 GHz; more preferably still at least 4.0 GHz, for example 4.1 GHz, 4.2 GHz, 4.3 GHz, 4.4 GHz, 4.5 GHz, 4.6 GHz, 4.7 GHz, 4.8 GHz or 4.9 GHz; more preferably still at least 5.0 GHz, for example 5.1 GHz, 5.2 GHz, 5.3 GHz, 5.4 GHz, 5.5 GHz, 5.6 GHz, 5.7 GHz, 5.8 GHz or 5.9 GHz.

The generated microwaves can be within a frequency range from minimum 2.0 GHz to maximum 6.0 GHz; more preferably at least 2.5 GHz to at most 6.0 GHz; more preferably still at least 3.0 GHz to at most 6.0 GHz; more preferably still at least 3.5 GHz to at most 6.0 GHz; more preferably still at least 4.0 GHz to at most 6.0 GHz; more preferably still at least 4.5 GHz to at most 6.0 GHz; more preferably still at least 5.0 GHz to at most 6.0 GHz; more preferably still at least 5.5 GHz to at most 6.0 GHz; more preferably still at least 5.6 GHz to at most 5.9 GHz, or at least 5.7 GHz to at most 5.9 GHz.

Systems of the prior art are typically designed to emit microwaves at a lower frequency, i.e. lower than 2.0 GHz, towards a wide target area and can consequently affect all of the plant tissue, roots and seeds growing in the target area, i.e. including non-weed plants such as crops or foliage. Consequently, treating weed plants using low-frequency, unfocussed microwaves requires high power, which in turn requires longer treatment times and/or a heavier battery or generator. Additionally, such microwaves also have an unnecessarily deep penetration depth at a lower frequency. As a result thereof, even though comparable systems from the prior art might exhibit the potential to control the growth of weeds by means of microwaves, they fail to achieve the efficiency that is required for industrial applicability.

A typical microwave generator suitable for the invention offers an integrated solution that is designed to generate and emit microwave power. The microwave generator can be functionally adjustable, so that the timing or properties of the microwaves can be controlled. In particular, the microwaves can be generated on demand, i.e. in reaction to an input signal that can be sent by a control system to the generator. Additionally, the properties of the microwaves, such as the power or the amplitude and/or frequency, can be adjustable at least to a certain extent.

Figure 4:
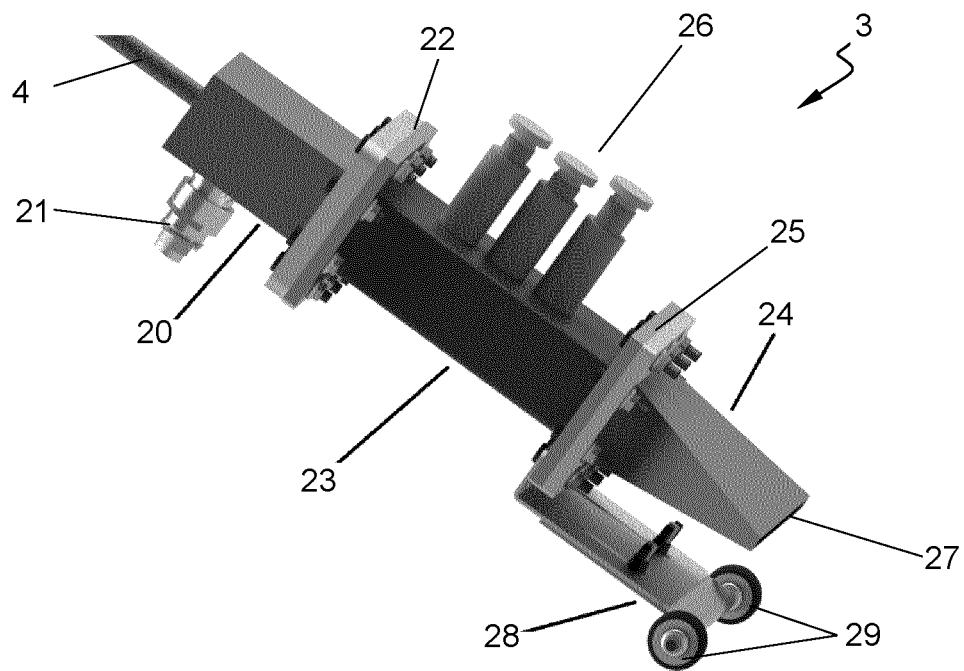
FIG. 4 shows the antenna system 3 at the end of the holder 4, as part of the device of FIG. 1.

The antenna system 3 according to one possible embodiment of the invention is shown in FIG. 4. The antenna system 3 includes a signal adapter 20 provided with a connection 21 to which the transmission line 2 is connected and which is mechanically attached to the end of the holder 4. The signal adapter 20 is a component that converts the electromagnetic microwave signal from the coaxial cable to a continuously emitted series of microwaves. The adapter 20 is hollow, and thereby defines a hollow space preferably with a square or rectangular cross section. A small antenna is located in the hollow space, which is connected to the cable 2 and which emits microwaves at the frequency and amplitude as transmitted by the generator 14. The microwaves propagate through the hollow space which functions as a waveguide, and further through additional waveguides which are connected to the adapter 20. Adapters 20 of this type are known in the prior art, and an existing type of adapter can be used in the device according to the present disclosure.

The signal adapter 20 is coupled via a first coupling flange 22 to two additional components, namely an impedance adapter 23 and an antenna 24, which are coupled to one another via a second coupling flange 25. Instead of providing one or both of the coupling flanges, the coupled components can also be produced as one uniform component.

The impedance adapter 23 is a waveguide with the same cross section as the signal adapter 20, so that the microwaves propagate further through the hollow space defined by the impedance adapter 23. However, this adapter is provided with three lateral control means 26. These are cylinders with manually retractable plunger elements. In other words, the adapter 23 is a component that is known in the prior art as a "stub tuner". The plungers form the "stubs" and the position of the plungers determines the impedance of the load that is formed by the transmission line 2, the antenna system 3 and the treated zone.

In the embodiment shown, the antenna 24 is an element with a square or rectangular inlet that matches the cross section of the impedance adapter 23 and with a slot-shaped (i.e. elongated) outlet 27. The microwaves are output via this outlet 27 in the vicinity of the weeds, by means of which they are heated to a temperature and/or pressure that destroys the weeds. However, the shape of the antenna is not fixed within the scope of the invention, and other shapes can be used, such as a horn antenna in which the cross section of the outlet is larger than that of the inlet (like in the case of a megaphone), or a wire antenna. Suitable types of horn antennas are, for example, a pyramidal horn, a conical horn, a sectoral horn, an exponential horn, and the like. The shape with a slot-shaped cross section 27 is useful, however, because the width of the outlet (this is the length of the elongate outlet section) can be optimized so that the impedance of the outlet corresponds as well as possible to the impedance of the zone to be treated, while the height of the outlet has little or no influence on the impedances. This height can then be designed as a function of the power of the generator and the maximum breakdown voltage.

The antenna can also consist of one or more antenna elements, for example multiple horn antennas. In an embodiment, at least one antenna element, preferably all of the antenna elements of the plurality of antenna elements, can be a dipole antenna. This type of antenna usually consists of two identical conductive elements such as metal wires or rods. A dipole antenna can take many shapes and the present invention is in no way limited to a certain type.

In an embodiment, at least one antenna element, preferably all of the antenna elements of the plurality of antenna elements, can be a patch antenna. This type of antenna usually consists of a piece of metal foil with specific shapes which are etched on the surface of a substrate, with a metal-foil ground plane on the other side. As an alternative, the patch antenna can consist of a metal patch that is mounted above a ground plane with the aid of dielectric spacers. A patch antenna can take many shapes and the present invention is in no way limited to a certain type. In particular, a patch antenna that is etched into the surface of a printed circuit board can also be referred to as a microstrip antenna. The use of a patch/microstrip antenna can have the advantage of reducing the footprint of the system and afford the possibility of integrating the antenna elements into a protective housing.

The zone to be treated in the context of treating weeds using microwaves is essentially to be considered as an open space, as far as the impedance of this space is concerned. Even when plants are located in this zone, the impedance deviates little from the theoretical impedance of free space, which is 377 ohm, as is known from the physics of space waves. Now, the device of the invention is designed such that no, or a few as possible, wave reflections occur at the transition between the antenna and the zone to be treated when the device is used to treat this zone, considering an impedance of the treated zone of approximately 377 ohm. This condition, namely the absence of reflections, is the condition in which the power of the generator is maximally transmitted to the treated zone. In the terminology of wave physics, it is said that an "impedance-matching" condition is created; in other words, the impedance of the load is matched to the impedance of the source.

For easier understanding of the impedance-matching condition, two exemplary scenarios will be discussed below. It should be appreciated that these examples represent an illustrative oversimplification of the physical principles and practical implementations of this technology will be described further below in the present disclosure.

Figure 7:
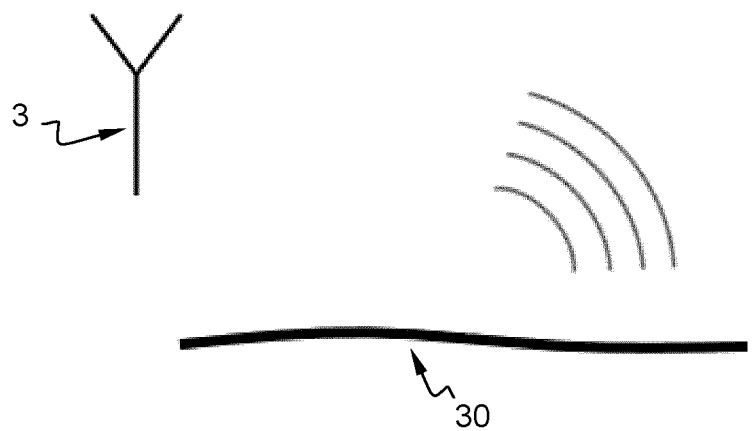
FIG. 7 schematically shows an antenna system 3 emitting microwaves onto an empty zone 30.

FIG. 7 illustrates a first scenario in which an antenna system 3 emits microwaves onto an open zone 30, e.g. weedless soil. Due to the lack of reflective material, the emitted microwaves will scatter across the surface of the soil, which will result in a loss of power. The amount of reflected microwave power (or lack thereof) can be detected by the antenna system to determine a degree of reflection and the corresponding impedance value, which for an open zone will correspond with the free-space value of 377 ohm.

Figure 8:
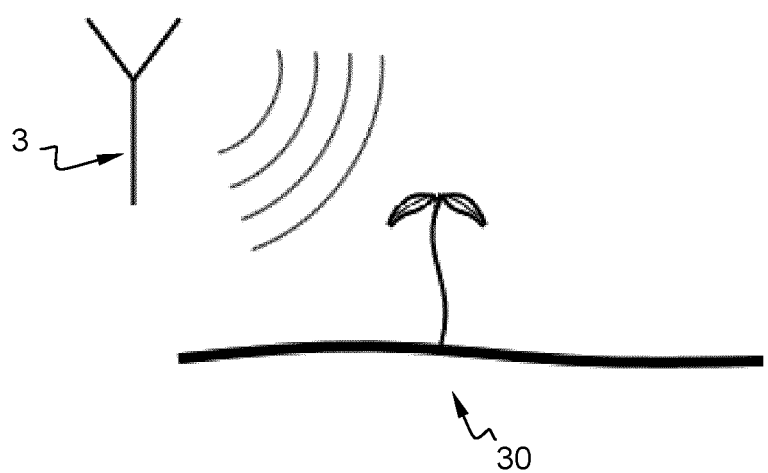
FIG. 8 schematically shows an antenna system 3 emitting microwaves onto a weed.
Figure 9:
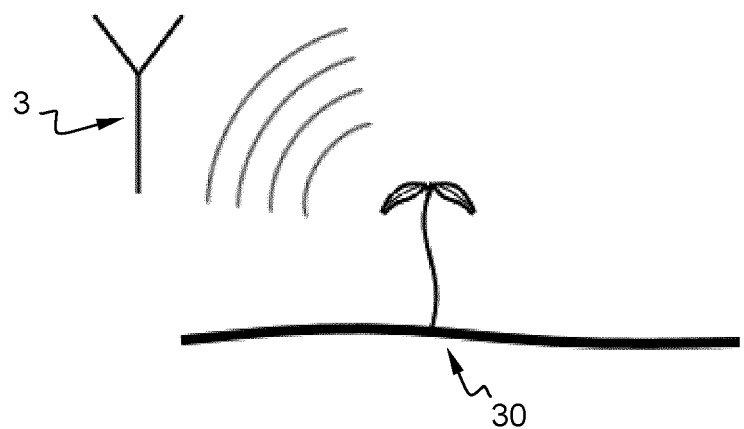
FIG. 9 schematically shows a weed reflecting microwaves back to the antenna system 3.

FIG. 8 illustrates a second scenario in which an antenna system 3 emits microwaves onto a zone in which weeds are growing. The weeds will absorb the microwaves but at least part will be reflected to the source antenna, as further shown in FIG. 9. The presence of the weeds will thereby change the impedance value of the zone to deviate from the above-referenced free-space value. The reflection coefficient and corresponding impedance value of the treated zone can be determined from the standing wave ratio within the antenna, which will be impacted when the emitted waves interfere with the reflected waves interfering. This way the presence of weeds in the treated zone can be effectively detected without increasing the complexity of the device with the use of cameras or sensors. Practical implementations of this impedance monitoring will be discussed below.

In the embodiment shown in FIG. 4, the impedance adapter 23 can be used to establish the impedance-matching condition for a determined treatment. This can be done by connecting the signal adapter 20 to a test generator via a coaxial cable that is the same length as and has the same specifications as the transmission line 2 of the device. The test generator includes or is connected to a measuring device that measures the impedance of the load, so that the "stubs" 26 can be set such that "impedance matching" occurs. During the actual treatment, the stubs 26 then remain in these set positions. However, the exemplary embodiment of FIG. 4 is not especially suitable for a use on a large scale, by inexperienced users who are not familiar with mechanically setting a "stub tuner" or the generator.

Figure 5:
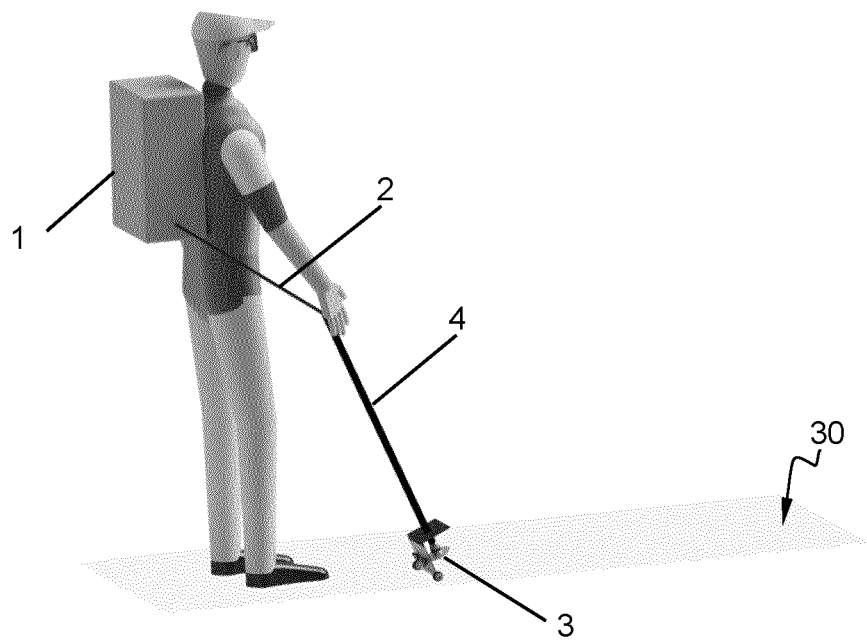
FIG. 5 shows another embodiment of the device according to a preferred embodiment, wherein the transmission line 2 is partly incorporated into the holder 4.

FIG. 5 shows another embodiment of the device in which the generator is not provided with or connected to a measuring device that is visible to the user, and in which the antenna system is not provided with a "stub tuner". In this embodiment, the antenna system 3 includes a waveguide whose impedance is configured beforehand according to the treatment of a zone with an impedance of 377 ohm or that deviates little from this value, which covers the vast majority of vegetated open zones. The omission of the "stub tuner" can reduce the operational complexity of the device to the benefit of user-friendliness for an inexperienced user. As shown in FIG. 5, the length of this guide can thus also be limited so that it forms virtually one continuous piece with the holder 4.

Figure 10:
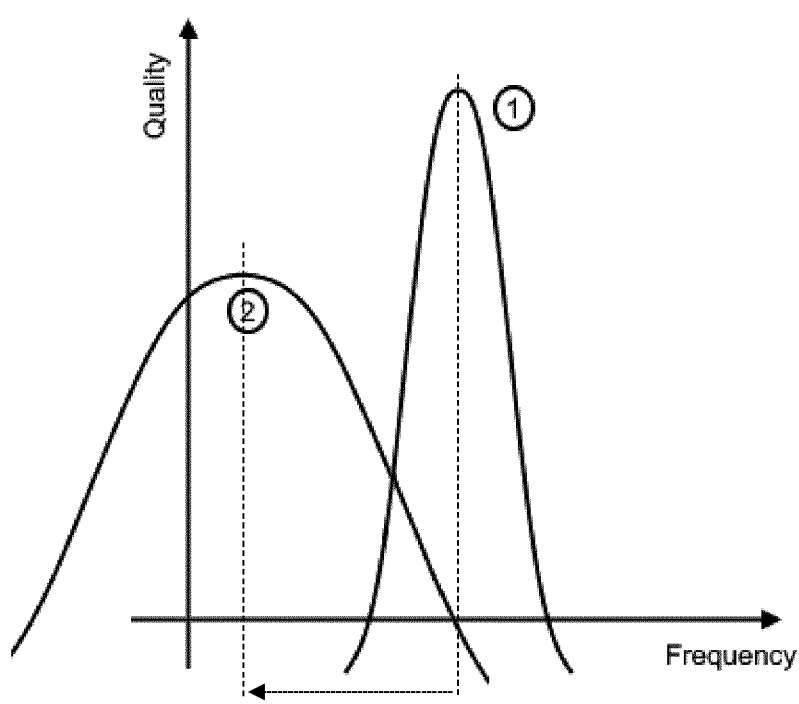
FIG. 10 shows the impact of the Q-factor on the resonance frequency bandwidth.

Although having the components of the device be preconfigured according to a static impedance value may reduce the device complexity, it may inadvertently also reduce the treatment efficiency. To clarify, the components of the device such as the transmission lines have a Q-factor (quality factor) associated with them, which represents of the strength of the damping of the wave oscillations resulting from the power loss mechanisms. FIG. 10 shows the possible impact of the Q-factor on the resonance frequency bandwidth, specifically, a higher Q-factor results in a narrower bandwidth (peak 1 on FIG. 10) whereas a lower Q-factor results in a broader bandwidth (peak 2 on FIG. 10). The resonance curve being more narrow means that a device configured for a higher Q-factor will require less power to treat a weed than a device having a lower Q-factor. However, in order to maintain such high Q-factor, the impedance-matching condition would need to be adjusted to the specific impedance factor of the treated weed, which is possible when focusing on a single weed type in a lab environment, but impractical when using the device in a field in which a variety of different weeds grows.

There are configurations which allows for minimising or preventing a shift of the Q-factor at the receiver and transmitter side. On the emitter side the device can be configured to minimise reflection of the microwaves. For example, the shape of the antenna could be provided with a shield such that the reflected waves are blocked. On the other hand, the device can be configured to maximise absorption of the microwaves by optimising the absorbance profile. However, as previously discussed, such configuration may be too complex for a single preconfigured impedance value. Nevertheless, this limitation may be overcome by implementing a variable impedance value by shifting the resonance frequency peak to a higher/lower frequency at the microwave generator.

Specifically, as further indicated with the dashed arrow in FIG. 10, because the bandwidth broadening (peak 2) is a result of a loss in quality, the narrow bandwidth can be maintained by shifting the microwave frequency whenever a Q-factor reduction is detected. This solution can be implemented as a dynamic adjustment of the emitted microwave frequency on the basis of the detected reflection profile of the treated zone. The dynamic microwave frequency adjustment is considered a preferred embodiment of the device and practical implementations of this technology will be described further below in the present disclosure.

In an embodiment the antenna system is configured such that the electromagnetic field created in a treated zone is strong enough to make the timespan in which a predetermined temperature of the treated zone is reached as short as possible, preferably less than 10 s. This speed is advantageous for treating weeds at an average walking speed.

Preferably, the device of the invention is additionally provided with a feedback unit that is configured to intervene in the operation of the device when the impedance of the treated zone deviates from a standard operating impedance value, preferably corresponding with the free-space value of 377 ohm. This can occur, for example, when the device is directed at material with a higher impedance value than plants, such as at a human's or animal's body. As discussed above, in the case of a different impedance value, the emitted wave will partly reflect back towards the antenna system, as a result of which this reflected wave will interfere with the emitted waves and change the standing wave ratio. By measuring the standing wave ratio, typically expressed as the reflection coefficient Γ, the degree of reflection can thus be determined. This feedback unit can thus, for example, serve as a safety measure against accidents and/or an efficiency measure to ensure treatment efficiency, as will be further described hereinbelow.

In an embodiment the feedback unit may be configured to function as a safety measure by preventing the emission of microwaves from the device whenever the presence of non-plant material is detected in the zone to be treated. As discussed above, non-plant organic materials, such as a human's or animal's body will have a greatly different impedance value than plant tissue, which can be determined in accordance with the above discussed standing wave ratio principle. It is evident that the same principle applies when the device is directed at inorganic or reflective materials, such as metals, which could potentially endanger safety by reflecting the microwaves at the user. Preferably, the emission of microwaves is prevented by reducing the power of the microwave generator to a harmless power level (i.e., harmless for the user), switching off the generator, and/or mechanically blocking the emission of the microwaves from the antenna system, for example by providing a slidable cover on the antenna system or within other components of the device such as the transmission line.

In an embodiment the feedback unit may be configured to function as an efficiency measure by dynamically adjusting one or more operating parameters of the microwave generator whenever a reduction of the Q-factor is determined during treatment. As discussed above, different plant types and/or growth stages will have slightly different impedance values corresponding with a different resonance frequency. The shift in resonance frequency might affect the resonance frequency bandwidth causing broadening such that more power and/or time is required to treat the weed. Thus, by dynamically shifting the microwave frequency to correspond with the impedance value of the weed in the treated zone the narrow resonance frequency bandwidth can be maintained to ensure efficient treatment. Accordingly, it is a preferred embodiment that feedback unit dynamically adjusts the frequency of the microwaves generated by the microwave generator to correspond with the resonance frequency of the treated zone.

In a preferred embodiment the feedback unit may be configured to function as a safety and efficiency measure by dynamically adjusting one or more operating parameters of the microwave generator, specifically shifting the microwave frequency, when the characteristics of a treated zone stay within a predefined safe operating range, and by preventing the emission of microwaves when said characteristics exceeds a predefined safe operating threshold. The characteristics of the treated zone may be determined in relation to one or more parameters of the above discussed standing wave ratio principle, which include the wave reflection, the standing wave ratio, the reflection coefficient and/or the impedance value. Practical implementations of these embodiments will be described next.

In one embodiment, the feedback unit can be configured to intervene by preventing the emission of microwaves with a wave reflection that is higher than 30% or 35%, preferably higher than 40% or 45%, more preferably still 50% or 55%, more preferably still 60% or 65%, more preferably still 70% or 75%, for example 80%, 85%, 90%, 95% or 100%.

In one embodiment, the feedback unit can be configured to intervene by preventing the emission of microwaves with a standing wave ratio higher than 5.0 or 5.5, preferably higher than 6.0 or 6.5, more preferably still higher than 7.0 or 7.5, more preferably still higher than 8.0 or 8.5, for example 9.0, 9.5 or 10.

In one embodiment, the feedback unit can be configured to intervene by preventing the emission of microwaves with a reflection coefficient lower than 0.95 or 0.9, preferably lower than 0.85 or 0.8, for example 0.75, 0.7, 0.65 or 0.6.

In one embodiment, the feedback unit can be configured to intervene by dynamically adjusting a microwave parameter with a wave reflection that is lower than 30% or 35%, preferably lower than 40% or 45%, more preferably still 50% or 55%, more preferably still 60% or 65%, more preferably still 70% or 75%, for example 80%, 85%, 90%, 95% or 100%.

In one embodiment, the feedback unit can be configured to intervene by dynamically adjusting a microwave parameter with a standing wave ratio lower than 5.0 or 5.5, preferably 6.0 or 6.5, more preferably still lower than 7.0 or 7.5, more preferably still lower than 8.0 or 8.5, for example 9.0, 9.5 or 10.

In one embodiment, the feedback unit can be configured to intervene by dynamically adjusting a microwave parameter with a reflection coefficient higher than 0.95 or 0.9.0, preferably higher than 0.85 or 0.80, for example 0.75, 0.70, 0.65 or 0.60.

The previously described configurations of the feedback unit are found to be suitable for precisely distinguishing between materials with an impedance value of 50 ohm or higher, such as a human's or animal's body, or plant tissue, without experiencing undesired interruptions as a result of other objects or materials that might be located in the zone to be treated. However, a person skilled in the art thus understands that the configuration of the feedback unit can be adapted according to the desired safety.

According to one embodiment of the feedback unit, it is possible to use an integrated detection and control unit in the generator in the device of the invention, which is provided with this option, and to set this up appropriately, so that the generator automatically cuts out or decreases in power when the detected impedance changes. The integrated control unit for controlling the feedback unit can form part of the control unit of the device per se, when this control unit forms an integral part of the generator.

However, the control unit of the device per se can also be a separate component that is connected to the generator, as well as to one or more input means and/or indicators, such as operating buttons or LEDs on the handle of the holder. The control unit of the device can also consist of a plurality of mutually connected control units, for example a control unit that forms part of the generator and which controls the feedback unit, and a separate control unit that is connected to the generator and to operating means and/or indicators intended for the user of the device. The feedback unit can thus also be connected to a warning system that notifies the user of a possible problem, for example via a sound signal or light.

Yet another embodiment of the feedback unit includes an antenna system provided with an impedance adapter which is not manually adjustable, but which includes an automatic adjustment system that can be controlled using electrical control signals. The automatic adapter is then connected to the control unit of the feedback unit as described hereinabove. When this control unit determines a deviation in the impedance that is too great, the impedance can be adjusted by sending control signals to the automatic adapter, so that a determined target value is maintained, or so that the "impedance matching" is potentially temporarily discontinued. This can take place instead of or in addition to the automatic control of the generator by the feedback unit.

In the embodiment shown, a roller system is attached to the second coupling flange 25 in the form of an angular plate 28 with two wheels 29 attached to the end. The wheels 29 rest on the ground and allow the holder 4 to be rolled over the ground. In this way, the distance between the outlet 27 and the ground surface is kept more or less constant when the holder 4 is held at an angle that deviates little from an average value. The invention is, however, not limited to a holder provided with such a roller system. According to another embodiment, the holder 4 does not rest on the ground, and the user determines for themself the distance from the ground surface at which the outlet 27 of the antenna 24 moves.

Figure 6:
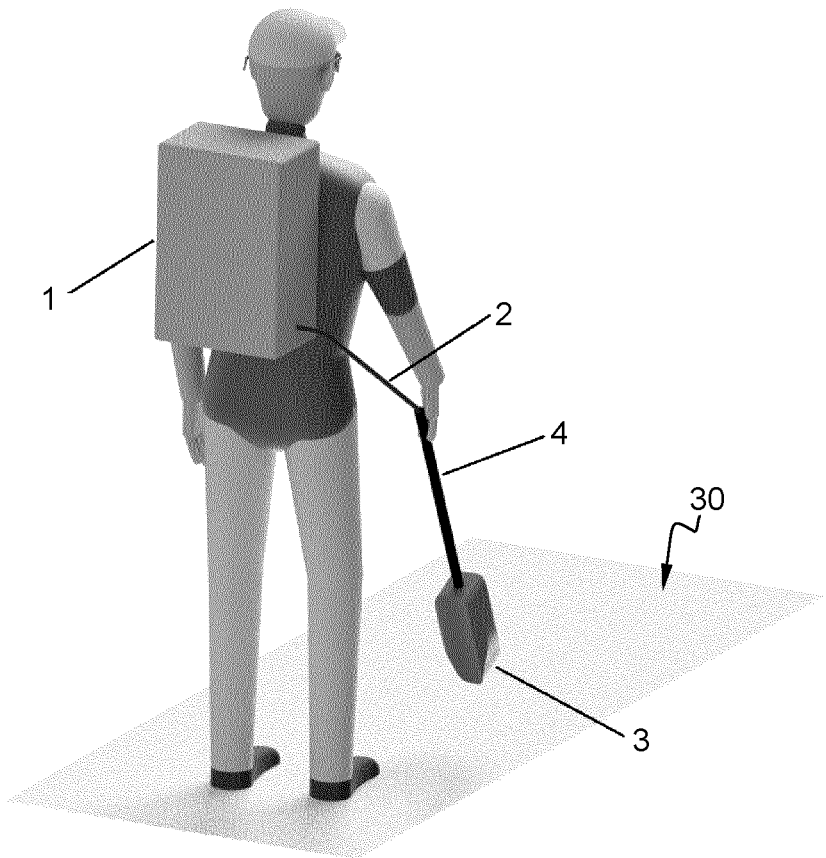
FIG. 6 shows another embodiment of the antenna system 3 on the device of FIG. 5.

FIG. 6 shows one alternative embodiment, in which the transmission line 2 is partly incorporated into the holder 4 which in this case comprises a hollow shank. The transmission line 2 is preferably again a coaxial cable that consists of a first portion running from the microwave generator 14 to the holder 4, and a second portion that is contained in the hollow shank of the holder 4. The first portion is long enough to enable all necessary manipulations of the shank. The antenna system 3 can be produced in the same way as in the embodiment of FIG. 4 or FIG. 5, except that the signal adapter 20 possibly has no lateral connection but rather a connection that is parallel to the holder. In any embodiment of the device, the portable portion 1 can be additionally provided with means for charging the battery 12. These means can consist of a port that a charger cable can plug into. In a preferred embodiment the portable portion 1 may comprise one or more solar cells that are attached to the housing 10, or of solar cells incorporated into the material, for example a textile, of the housing 10, such that the battery can be recharged, optionally during use of the device.

According to another embodiment of the device, the power supply may comprise a cable that connects to an external power source. This power supply can consist of a port that a power cable connected to the external power source can plug into and a device configured for the transmission of electrical energy by means of which the energy of the power source is adjusted to the power requirements of the microwave generator, for example a transformer. The external power source may for example be a portable power generator, which is placed in the field in the vicinity of the zone to be treated, or alternatively directly connect to the electrical grid.

In any embodiment of the device, holder 4 can be additionally provided with a user interaction panel, preferably provided with indicators, for example a green and red LED, which indicate when enough energy is delivered to a given portion of the treated vegetation. These indicators are controlled by the control unit of the device on the basis of various parameters, possibly including the power and the frequency of the generator 14, or input data entered by the user. There is preferably also an indication on the holder 4 that indicates to what extent the battery is charged and/or how much charge is left.

According to one embodiment, the device is provided with a temperature sensor arranged on the microwave generator 14, which is preferably a spectral sensor connected to the control unit of the device and wherein the control unit is configured to adjust the operation of the microwave generator on the basis of the measured spectrum, preferably by switching off the microwave generator when a predetermined temperature threshold value is exceeded. The spectral sensor can be an infrared sensor.

Another aspect of the present disclosure relates to a feedback unit for use in a device for treating weeds by means of microwaves. It may be appreciated that the above-discussed feedback unit and any embodiments thereof can be applied independently to a device having a configuration different than the above-described portable device. Specifically, this feedback unit, advantageously in the form of an integrated control unit, can be applied on a device whereby the microwave generator need not be comprised in a portable portion and/or the microwave emitter need not be attached to a holder. However, in order to avoid repetition in writing, reference is made the principles and practical implementations of the feedback unit as described above. Unless otherwise specified, it may be understood that all embodiment of the feedback unit when applied onto the above describe portable device also form embodiments of the feedback unit when applied onto a differently configured device.

Another aspect of the present disclosure relates to a device for treating weeds by means of microwaves, wherein the device comprises the following components:
- a microwave generator and a power supply for supplying power to said generator are arranged;
- an antenna system configured for guiding microwaves out into a zone to be treated,
- optionally, a transmission line or waveguide configured for transmitting the microwaves from the microwave generator to the antenna system; and
- a control unit that is operatively connected to or forms part of the microwave generator; wherein said control unit is configured detect a change in the impedance of a treated zone outside of a predetermined range around a desired value of this impedance, and to intervene in the operation of the device when said change is detected.

In an embodiment, the control unit may be configured to function as a safety measure by preventing the emission of microwaves from the device whenever the presence of non-weed organic material and/or inorganic material is detected in the zone to be treated; preferably by reducing the power of the microwave generator to a harmless level, switching off the generator, and/or mechanically blocking the emission of the microwaves from the antenna system.

In an embodiment, the control may be configured to function as an efficiency measure by dynamically adjusting one or more operating parameters of the microwave generator whenever a reduction of the Q-factor is determined; preferably by adjusting the microwave frequency to correspond with the resonance frequency of the treated zone.

In an embodiment the device may comprise or be arranged on a vehicle, preferably an autonomous vehicle (AV), which can benefit from the same advantageous safety measure against accidents and/or an efficiency measure to ensure treatment efficiency when moving the device over the zone to be treated, as previously discussed for the device in a portable embodiment.

The invention claimed is:

1. A device for treating weeds with microwaves, wherein the device comprises the following components:
   - a portable portion configured to be secured to the body of a user; wherein the portable portion comprises a housing within which a microwave generator is arranged, and a power supply for supplying power to said generator;
   - a holder provided with at least two ends, wherein the holder is configured to be held by the user by one end and wherein an antenna is attached to the other end, which is configured for guiding microwaves out into a zone to be treated; and
   - a transmission line configured for transmitting the microwaves from the microwave generator to the antenna system.

2. The device according to claim 1, wherein the antenna system comprises the following components, arranged one after the next:
   - a signal adapter for converting the signal from the transmission line into microwaves,
   - a waveguide, and
   - an antenna or group of antenna elements.

3. The device according to claim 2, wherein the waveguide is an impedance adapter, the impedance of which can be adjusted manually or automatically, so that few to no reflections occur at the transition between the antenna or a group of antenna elements and the zone to be treated.

4. The device according to claim 2, wherein the waveguide's impedance is configured such that few to no reflections occur at the transition between the antenna or a group of antenna elements and the zone to be treated when the impedance of this zone is in a predetermined range around the value of 377 ohm.

5. The device according to claim 2, wherein the antenna has an inlet section that is coupled to the signal adapter or the waveguide, and a slot-shaped outlet section along which the microwaves are guided to the outside.

6. The device according to claim 1, further comprising a control unit that is operatively connected to or forms part of the microwave generator, and is configured to control the operation of the microwave generator on the basis of
   (i) the user's input,
   (ii) detected information regarding a zone to be treated, and/or
   (iii) detected information regarding the operation of the device itself.

7. The device according to claim 6, further comprising a temperature sensor connected to the control unit and arranged on the microwave generator, and wherein the control unit is configured to adjust the operation of the microwave generator on the basis of the measured temperature by switching off the microwave generator when a predetermined threshold value is exceeded.

8. The device according to claim 6, further comprising a feedback unit configured to detect a change in the impedance of a treated zone outside of a predetermined range around a desired value of this impedance, and to intervene in the operation of the device when said change is detected.

9. The device according to claim 8, wherein the feedback unit is configured to function as a safety measure by preventing the emission of microwaves from the device whenever the presence of non-weed organic material and/or inorganic material is detected in the zone to be treated by reducing the power of the microwave generator to a harmless level, switching off the generator, and/or mechanically blocking the emission of the microwaves from the antenna system.

10. The device according to claim 9, wherein the feedback unit is configured for measuring and/or determining a wave reflection, a standing wave ratio and/or a reflection coefficient, and to prevent the emission of microwaves when
the wave reflection is lower than or equal to 30%,
the standing wave ratio is lower than or equal to 8, and/or
the reflection coefficient is higher than or equal to 0.8.

11. The device according to claim 8, wherein the feedback unit is configured to function as an efficiency measure by dynamically adjusting one or more operating parameters of the microwave generator whenever a reduction of the Q-factor is determined; by adjusting the microwave frequency to correspond with the resonance frequency of the zone during treatment.

12. The device according to claim 11, wherein the feedback unit is configured for measuring and/or determining a wave reflection, a standing wave ratio and/or a reflection coefficient, and to dynamically adjust one or more operating parameters of the device when
the wave reflection is higher than or equal to 30%,
the standing wave ratio is higher than or equal to 8, and/or
the reflection coefficient is lower than or equal to 0.8.

13. The device according to claim 1, wherein the microwave generator is a solid-state microwave generator.

14. The device according to claim 1, wherein the portable portion comprises a power source.

15. The device according to claim 14, wherein the portable portion comprises a cooling element for cooling the microwave generator and/or the power source.

16. The device according to claim 1, wherein the portable portion comprises a port for connecting a power cable connected to an external power source, and a device for the transmission of electrical energy by which the energy of said source is adjusted to the power requirements of the microwave generator.

17. The device according to claim 1, wherein the holder is in the shape of an elongate shank, the first end of which is provided with a handle for the user and the other end of which is coupled to the antenna system.

18. The device according to claim 1, wherein the handle is provided with an input device for the user and/or with indicators provided to give the user information on a treatment of a zone.

19. The device according to claim 1, wherein the holder is provided with a hollow passage and wherein part of the transmission line and/or the waveguide is located in this hollow passage.

20. The device according to claim 1, wherein the antenna system and/or the holder is provided with a roller system by which the user can roll the holder over the ground during the treatment of a zone.

21. A method for treating weeds with microwaves using a device according to claim 1, the method comprising:
(a) generating microwaves using a microwave generator;
(b) directing generated microwaves towards a zone to be treated;
(c) determining an impedance value of the zone to be treated by measuring a wave reflection, standing wave ratio and/or reflection coefficient;
(d) continuing with the directing of generated microwaves when
a wave reflection is lower than or equal to 30%,
a standing wave ratio is lower than or equal to 8, and/or
a reflection coefficient is higher than or equal to 0.8.

22. The method according to claim 21, wherein step (d) comprises stopping the directing of generated microwaves when
a wave reflection is higher than 30%,
a standing wave ratio is higher than 8, and/or
a reflection coefficient is lower than 0.8.

23. The method according to claim 21, further comprising:
(e) adjusting one or more operating parameters of the microwave generator whenever a reduction of the Q-factor is determined; by dynamically adjusting the microwave frequency to correspond with the resonance frequency of the zone during treatment.

* * * * *